(12) United States Patent
Ramirez-Mireles et al.

(10) Patent No.: US 7,076,002 B1
(45) Date of Patent: Jul. 11, 2006

(54) METHOD AND APPARATUS FOR SYMBOL BOUNDARY SYNCHRONIZATION

(75) Inventors: Fernando Ramirez-Mireles, Walnut Creek, CA (US); Robert Ayrapetian, Morgan Hill, CA (US); Dale Smith, Fremont, CA (US); Max Chien, Menlo Park, CA (US); Sam Heidari, Menlo Park, CA (US)

(73) Assignee: Ikanos Communication, Inc., Fremont, CA (US)

( * ) Notice: Subject to any disclaimer, the term of this patent is extended or adjusted under 35 U.S.C. 154(b) by 676 days.

(21) Appl. No.: 10/117,823

(22) Filed: Apr. 5, 2002

Related U.S. Application Data

(60) Provisional application No. 60/282,209, filed on Apr. 5, 2001, provisional application No. 60/332,791, filed on Nov. 5, 2001.

(51) Int. Cl.
*H04L 27/14* (2006.01)
*H04L 7/00* (2006.01)
*H04J 3/06* (2006.01)
*H04J 3/12* (2006.01)

(52) U.S. Cl. .................. 375/316; 375/355; 370/503; 370/523

(58) Field of Classification Search ............... 375/354, 375/326, 327, 355, 360, 371, 222, 229, 316, 375/362–367; 370/502, 503, 509–516, 525–528, 370/522
See application file for complete search history.

(56) References Cited

U.S. PATENT DOCUMENTS 3,636,454 A * 1/1972 Pasternack et al. ......... 375/327
3,674,935 A * 7/1972 Lawrence .................. 375/327
4,012,698 A * 3/1977 Karlsson .................... 327/160

(Continued)

OTHER PUBLICATIONS

Cioffi, "Digital Duplexing: VDSL Performance Improvement by Aversion of Frequency Guard Bands (TD13)", Sep. 20-24, 1999, ETSI TM6, Endinburgh.*

(Continued)

*Primary Examiner*—Tesfaldet Bocure
*Assistant Examiner*—Vineeta Panwalkar
(74) *Attorney, Agent, or Firm*—IP Creators; Charles C Cary

(57) ABSTRACT

The apparatus for symbol boundary synchronization in one embodiment includes on the receive path of a multi-tone modem a window synchronizer, a converter and a symbol boundary component. The window synchronizer obtains windowed portions of the received datastream which includes symbols each expressed with a corresponding set of tones in a time domain. The windowed portions obtained in the training phase exhibit varying degrees of misalignment with the corresponding symbol boundaries. The window synchronizer is responsive to an alignment signal to obtain succeeding windowed portions of the incoming datastream aligned with the corresponding symbol boundaries therein. The converter couples to the window synchronizer to convert the set of tones from each windowed portion from the time domain to a frequency domain. The symbol boundary module couples to the converter to evaluate a phasor angle characteristic of selected tones from each windowed portion converted by the converter and to convert the phasor angle characteristic of the selected tones from a selected one of the windowed portions to the alignment signal to align the window synchronizer with the symbol boundaries in the received datastream. In an alternate embodiment of the invention the symbol boundary component couples to the window synchronizer to correlate sign values of the selected tones with a reference set and to output the alignment signal identifying the corresponding windowed portion which exhibits maximum correlation with the reference set to align the window synchronizer.

5 Claims, 11 Drawing Sheets

U.S. PATENT DOCUMENTS

| | | | |
|---|---|---|---|
| 5,625,651 A * | 4/1997 | Cioffi ........................ | 375/354 |
| 6,353,636 B1 * | 3/2002 | Tate et al. .................. | 375/260 |
| 6,377,683 B1 * | 4/2002 | Dobson et al. ........ | 379/406.12 |
| 6,393,051 B1 * | 5/2002 | Koizumi et al. ............ | 375/220 |
| 6,577,690 B1 * | 6/2003 | Barman et al. ............. | 375/354 |
| 6,735,244 B1 * | 5/2004 | Hasegawa et al. .......... | 375/219 |
| 6,965,617 B1 * | 11/2005 | Hasegawa et al. .......... | 370/503 |
| 6,965,649 B1 * | 11/2005 | Miyoshi et al. ............. | 375/259 |
| 2002/0008525 A1 * | 1/2002 | Seagraves et al. .......... | 324/500 |

OTHER PUBLICATIONS

Sjoberg et al. "Zipper: A Duplex Method for VDSL Based on DMT", IEEE Transactions on Communications, vol. 47, No. 8, Aug. 1999.*

* cited by examiner

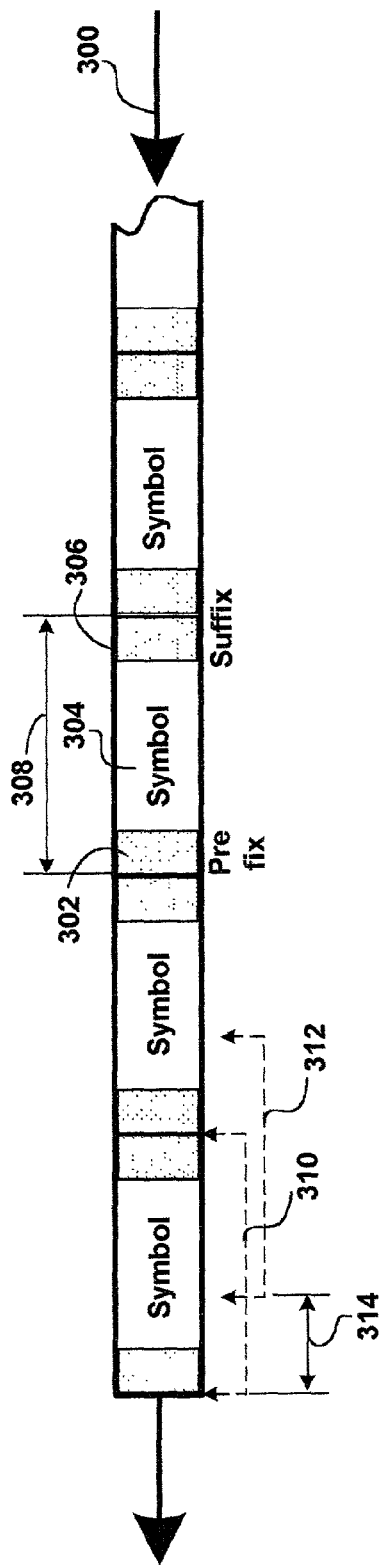
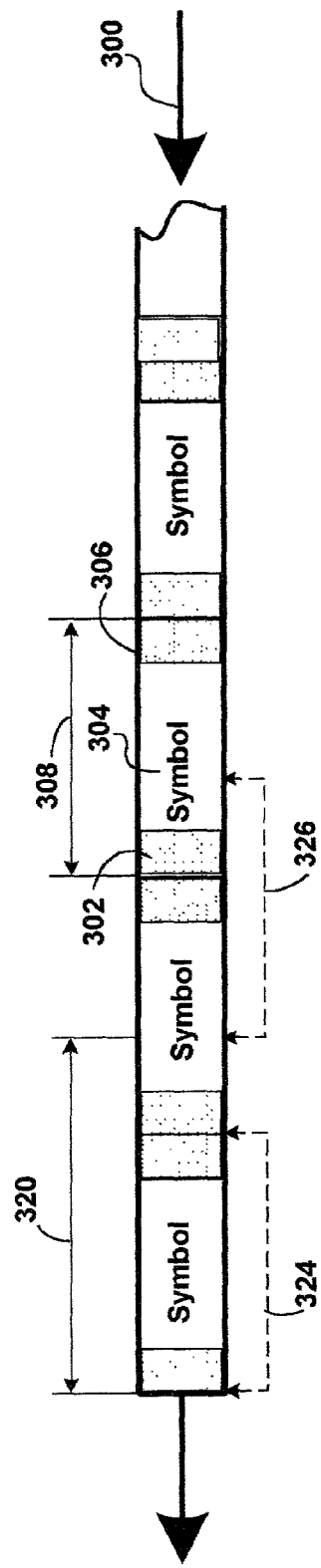
FIG 3A
FIG. 3B

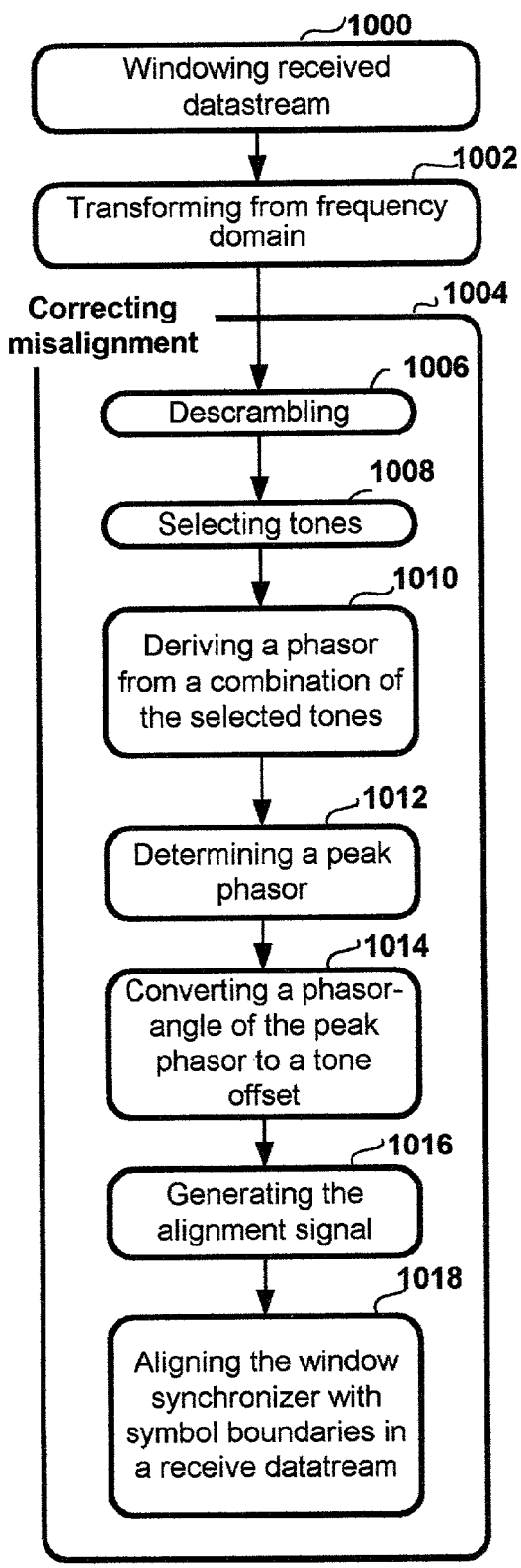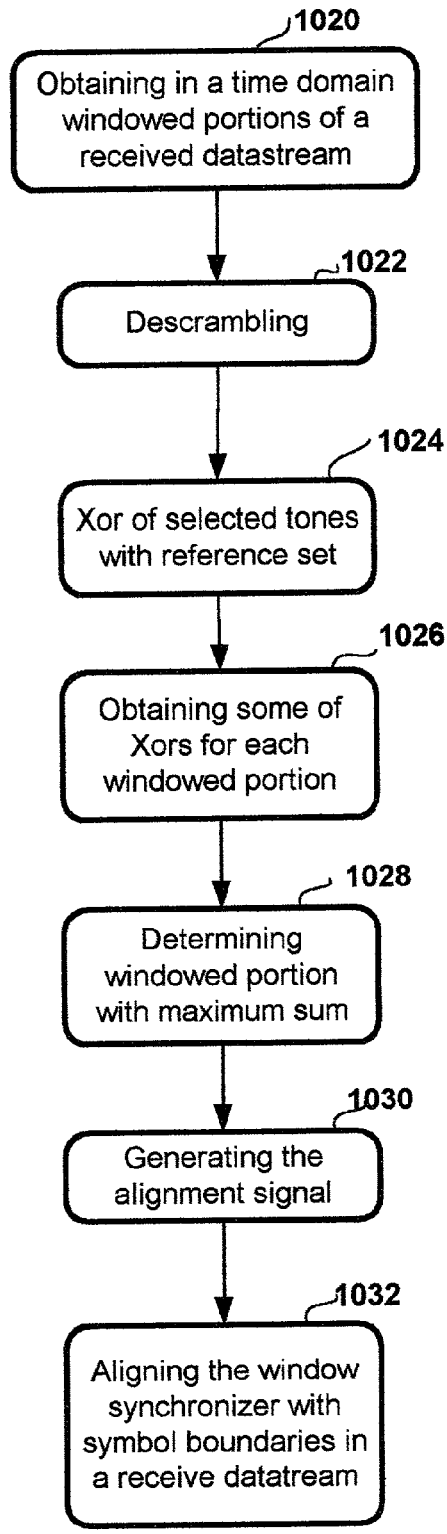
FIG. 10A
FIG. 10B

METHOD AND APPARATUS FOR SYMBOL BOUNDARY SYNCHRONIZATION

CROSS REFERENCE TO RELATED APPLICATION

This application claims the benefit of prior filed now abandoned Provisional Application No. 60/282,209 filed on Apr. 5, 2001 entitled "Simplified symbol boundary detection for VDSL modulation initialization" and Provisional Application No. 60/332,791 filed on Nov. 5, 2001 entitled "Symbol timing acquisition for VDSL signals" which are incorporated herein by reference in their entirety as if fully set forth herein.

BACKGROUND OF THE INVENTION

1. Field of Invention

The field of the present invention relates in general to modems and more particularly digital modems.

2. Description of the Related Art

Digital Subscriber Lines (DSL) technology and improvements thereon including: G.Lite, ADSL, VDSL, HDSL all of which are broadly identified as X-DSL have been developed to increase the effective bandwidth of existing subscriber line connections, without requiring the installation of new fiber optic cable. Subscriber lines were originally constructed to handle voice traffic in the narrow band between 300 Hz to 3000 Hz at bandwidths equivalent to several kilo baud. With X-DSL significant increases in bandwidth have been made possible by utilizing frequencies higher than the voice band to deliver services such as: data, video, audio etc. Thus an X-DSL modem may operate simultaneously with a voice band modem or a telephone conversation.

Currently there are over ten X-DSL standards, including: G.Lite, ADSL, VDSL, SDSL, MDSL, RADSL, HDSL, etc. Within each standard there may be more than one line code, or modulation protocol, e.g. discrete multi-tone (DMT) and carrier less AM/PM (CAP). DMT modulation involves establishing a communication channel with a plurality of sub-channels each with a center frequency a.k.a. carrier tone. The sub-channels are frequency division multiplexed across the available bandwidth. Each sub-channel uses quadrature phase amplitude modulation (QPAM) to modulate information. The center frequency, a.k.a. tone of each sub-channel serves as the carrier on which QPAM modulation of information is effected. The information modulated on a tone is identified in the frequency domain as a sub-symbol which defines a unique phase and amplitude relationship between the carrier tone and the information modulated on it. Each sub-symbol may be expressed as a complex number. Specific bits of information are converted to a corresponding complex number using a mapping table, which defines for all possible phase and amplitudes supported by the DMT protocol corresponding binary bits. Collectively all the sub-symbols modulated on each tone across a tone set are defined as a symbol, with the symbol rate defined by the corresponding X-DSL standard.

Typically initialization of an X-DSL modem utilizing a DMT modulation protocol, begins with several discrete phases of initialization including: handshake, training, channel analysis and showtime. The outcome of initialization is a contract between the modems on communication parameters which takes into account both modem capabilities and limitations in the quality of the communication medium linking the modems.

During the handshake phase each modem passes to the other basic identity information such as: inverse or discrete Fourier transform size and the initial length of the cyclic extension. This information is passed using a modulation protocol such as binary phase shift key (BPSK) with a single carrier. The use of BPSK allows information to be exchanged without using DMT modulation. The next and subsequent initialization phases utilize DMT modulation with various degrees of complexity up to the showtime phase at which the full transport capabilities of the modems and the subscriber line by which they are coupled have been trained.

The training phase involves setting gains, synchronizing clocks, synchronizing of symbol boundaries, and determination of weights associated with time or frequency domain equalization and echo cancellation. All of these are accomplished with a fixed set of data, a.k.a. pilot tones, modulated on selected sub-channels. The pilot tones and the manner in which they are modulated are known to both sending and receiving modems. The channel analysis phase follows the training phase.

During channel analysis each tone is modulated with varying amount of data in order to maximize the data carrying capability of the communication medium that links the modems. During this phase the modems pass parameters which allow each to establish a bit loading for each tone across a tone set. At the completion of the channel analysis and exchange the modems enter showtime state in which communication of voice, data, video, etc. across the communication medium begins.

The trend in X-DSL communication is toward integrating optical network units (ONU) and X-DSL modems to bridge the gap between the high speed backbone provided by the public switched telephone network (PSTN) and other long haul providers and the subscriber residence. The very high-speed digital subscriber line (V-DSL) offers short haul bandwidth approaching that achievable with ONU. This bandwidth is achieved by extending the upper limits of the frequency range at which the modem is required to operate. The combination of enhanced bandwidth, very low signal to noise ratios, and the bundling of subscriber lines results in initialization procedures for VDSL modems which are more complex than is the case for the lower bandwidth X-DSL standards such as ADSL.

VDSL modems require during the training phase of initialization an exchange of information other than pilot tones over the DMT link that they are setting up. VDSL draft trial standard document entitled "*Very-high bit-rate Digital Subscriber Lines (VDSL) Metallic Interface, Part 3: Technical Specifications of a Multi-Carrier Modulation Transceiver*" at Chapter 11, Link Activation and Deactivation pp. 36–58, T1E1.4/2000-013R2 promulgated by the Committee T1-Telecommunications, Working Group T1E1 (DSL Access) Vancouver, Canada, Aug. 14–18, 2000 sets forth such a standard. The draft standard calls for pilot tones interlaced with message tones to convey information between the modems which identify: bandwidth allocation, radio frequency interference (RFI) bands, transmit power spectral density (PSD) in the downstream and upstream directions, whether power back off (PBO) is performed using a maximum receive PSD or using an upstream PSD mask, the reference PSD, and the overall length of the window at the transmitter. The modems utilize this information to establish communication parameters for the training and subsequent phases of operation.

What is needed is a modem with improved capabilities for handling information transfer on a complex modulation protocol such as DMT during the training phase.

SUMMARY OF THE INVENTION

The present invention provides a method and apparatus for demodulating data received over a communication medium. The invention allows symbol boundary synchronization with a minimum of time and processing overhead. The invention may be applied with particular advantage to the training phase of modems implementing VDSL or other similar multi-tone communication protocols which include in the training or other phases of operation symbols with pilot or pilot and message data interlaced with one another. In an embodiment of the invention the communication protocol utilized for modulation and demodulation is discrete multi tone (DMT). The communication medium may be wired or wireless. The communication may be conducted between logical and or physical modems in any combination. The invention may be implemented in hardware, firmware or software.

The apparatus for symbol boundary synchronization in one embodiment of the invention includes on the receive path of a DMT or other multi-tone modem a window synchronizer, a converter and a symbol boundary component. The window synchronizer obtains windowed portions of the received datastream which includes symbols each expressed with a corresponding set of tones in a time domain. The windowed portions obtained in the training phase exhibit varying degrees of misalignment with the corresponding symbol boundaries. The window synchronizer is responsive to an alignment signal to obtain succeeding windowed portions of the incoming datastream aligned with the corresponding symbol boundaries therein. The converter couples to the window synchronizer to convert the set of tones from each windowed portion from the time domain to a frequency domain. The symbol boundary component couples to the converter to evaluate a phasor angle characteristic of selected tones from each windowed portion converted by the converter and to convert the phasor angle characteristic of the selected tones from a selected one of the windowed portions to the alignment signal to align the window synchronizer with the symbol boundaries in the received datastream.

In an alternate embodiment of the invention the apparatus includes on the receive path of a DMT or other multi-tone modem a window synchronizer and a symbol boundary component. The window synchronizer obtains windowed portions of the received datastream. The windowed portions obtained in the training phase exhibit varying degrees of misalignment with the corresponding symbol boundaries. The window synchronizer is responsive to an alignment signal to obtain succeeding windowed portions of the incoming datastream aligned with the corresponding symbol boundaries therein. The symbol boundary component couples to the window synchronizer to correlate sign values of the selected tones with a reference set and to output the alignment signal identifying the corresponding windowed portion which exhibits maximum correlation with the reference set to align the window synchronizer with the symbol boundaries in the received datastream.

In an alternate embodiment of the invention a method for demodulating data received over a communication medium with a communication channel with multiple pilot tones with pilot data modulated thereon is disclosed. The method for demodulating comprising:

obtaining in a time domain windowed portions of a received datastream with symbols each expressed with a corresponding set of tones and with the windowed portions obtained in a training phase exhibiting varying degrees of misalignment with corresponding symbol boundaries;

transforming the set of tones from each windowed portion from the time domain to a corresponding set of tones in a frequency domain; and correcting misalignment of the windowed portions obtained in the time domain using phasor angle parameters derived in the frequency domain from at least two tones from the set of tones for a selected windowed portion transformed in the transforming act.

In another embodiment of the invention the method for demodulating comprises:

obtaining in a time domain windowed portions of a received datastream with symbols each expressed with a corresponding set of tones and with the windowed portions obtained in a training phase exhibiting varying degrees of misalignment with corresponding symbol boundaries; and correlating sign values of the selected tones within each corresponding windowed portion with a reference set; and identifying the corresponding windowed portion for which the sign values of the selected tones exhibits maximum correlation to align the windowed portions obtained in the obtaining act with the corresponding symbol boundaries.

BRIEF DESCRIPTION OF THE DRAWINGS

These and other features and advantages of the present invention will become more apparent to those skilled in the art from the following detailed description in conjunction with the appended drawings in which:

FIG. 3 shows the data structures of a received datastream and alternate methods of obtaining windowed portions there from during a training phase of modem operation.

FIGS. 10A–B are detailed process flow diagrams of alternate embodiments of the invention in which symbol boundary alignment is determined with frequency and time domain data respectively.

DETAILED DESCRIPTION OF THE EMBODIMENTS

Figure 1:
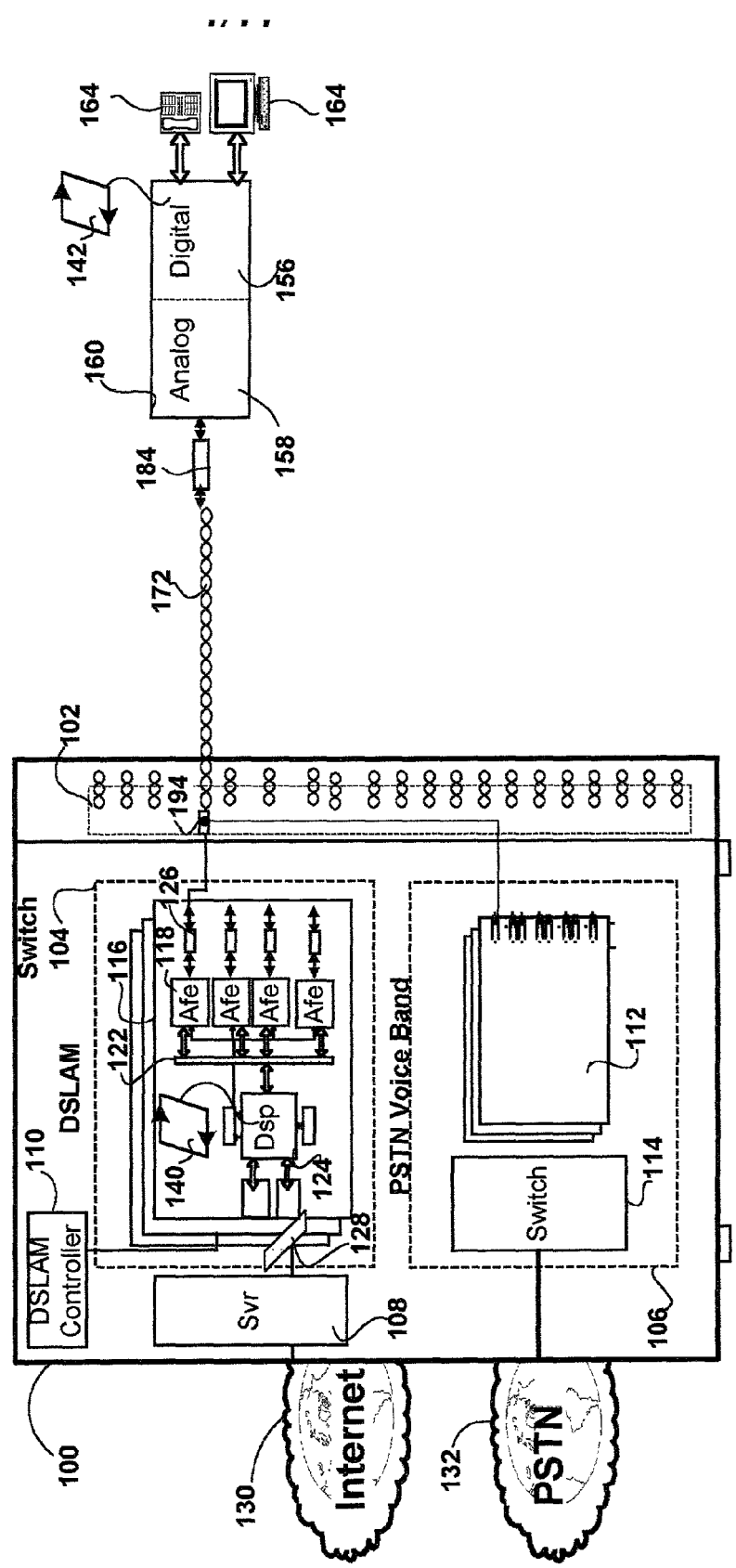
FIG. 1 shows a communication system with a logical modem at a central office (CO) coupled over a subscriber line to a physical modem at a customer's premises.

FIG. 1 shows a communication system with a logical modem at a central office (CO) coupled over a subscriber line to a physical modem at a customer's premises. The system includes the CO 100 coupled across a subscriber line 172 with a physical modem 160 positioned at a customer's premises.

All subscriber lines handled by the CO originate in the frame room 102 of the CO. From this room connections are made for each subscriber line via splitters and hybrids to both a digital subscriber line access module (DSLAM) 104 and to the voice band racks 106. The splitter 194 shunts voice band communications to dedicated line cards, e.g. line card 112 or to a voice band modem pool (not shown). The splitter shunts higher frequency X-DSL communications on the subscriber line to a selected line card, e.g. line card 116, within DSLAM 104. Voice band call set up is controlled by a Telco switch matrix 114 such as SS7. This makes point-to-point connections to other subscribers for voice band communications across the public switched telephone network 132. The X-DSL communications may be processed by a universal line card such as line card 116. That line card implements a plurality of logical modems via a digital signal processor (DSP) 124 coupled across a packet bus 122 with a number of analog front ends (AFE) of which AFE 118 is referenced. Each AFE couples via a hybrid front end (HFE) with a corresponding one of the subscriber lines. AFE 118 couples via HFE 126 with subscriber line 172. For downstream communications from the CO to the remote site, the DSP modulates the data for each communication channel, the AFE transforms the digital symbol packets assembled by the DSP and converts them to an analog signal which is output on the subscriber line associated with the respective channel. For upstream communications from the remote site to the CO the AFE converts the communications to digitized data samples which are sent to the DSP where they are demodulated. The DSP may be capable of multi-protocol support for all subscriber lines to which the AFE's are coupled. Communication between AFE(s) and DSP(s) may be packet based. The line card 116 is coupled to a back-plane bus 128 which may be capable of offloading and transporting X-DSL traffic between other DSPs for load balancing. The back-plane bus of the DSLAM also couples each line card to the Internet 130 via server 108. Each of the DSLAM line cards operates under the control of a DSLAM controller 110 which handles global provisioning, e.g. allocation of subscriber lines to AFE and DSP resources. The various components on the line card form a plurality of logical modems each handling upstream and downstream communications across corresponding subscriber lines. When an X-DSL communication is established on a subscriber line, a specific channel identifier is allocated to that communication. That identifier may be used in the above mentioned packet based embodiment to track each packet as it moves in an upstream or downstream direction between the AFE and DSP.

At the customer premises a physical modem 160 is shown coupled via HFE 184 to subscriber line 172. That physical modem has an analog portion 158 and a digital portion 156. The physical modem couples voice band communications with the phone 164 and X-DSL band communications with the computer terminal 164. The logical modem on line card 116 and the physical modem 160 each perform training processes 140,142 respectively during initialization of a communication channel between them.

Figure 2A:
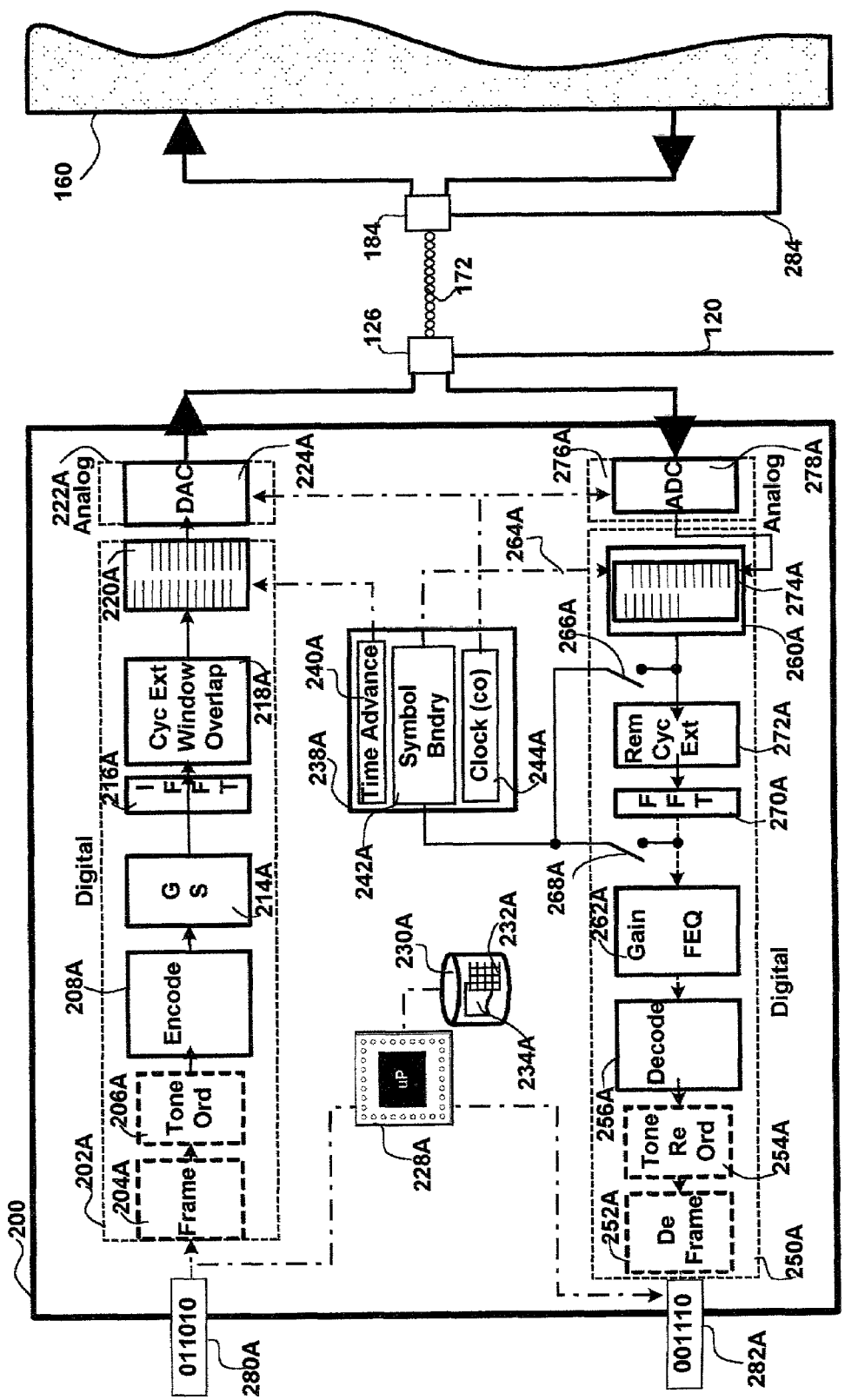
FIGS. 2A–B are detailed hardware block diagrams which show the transmit and receive path components of the logical and physical modems respectively in an embodiment of the current invention.
Figure 2B:
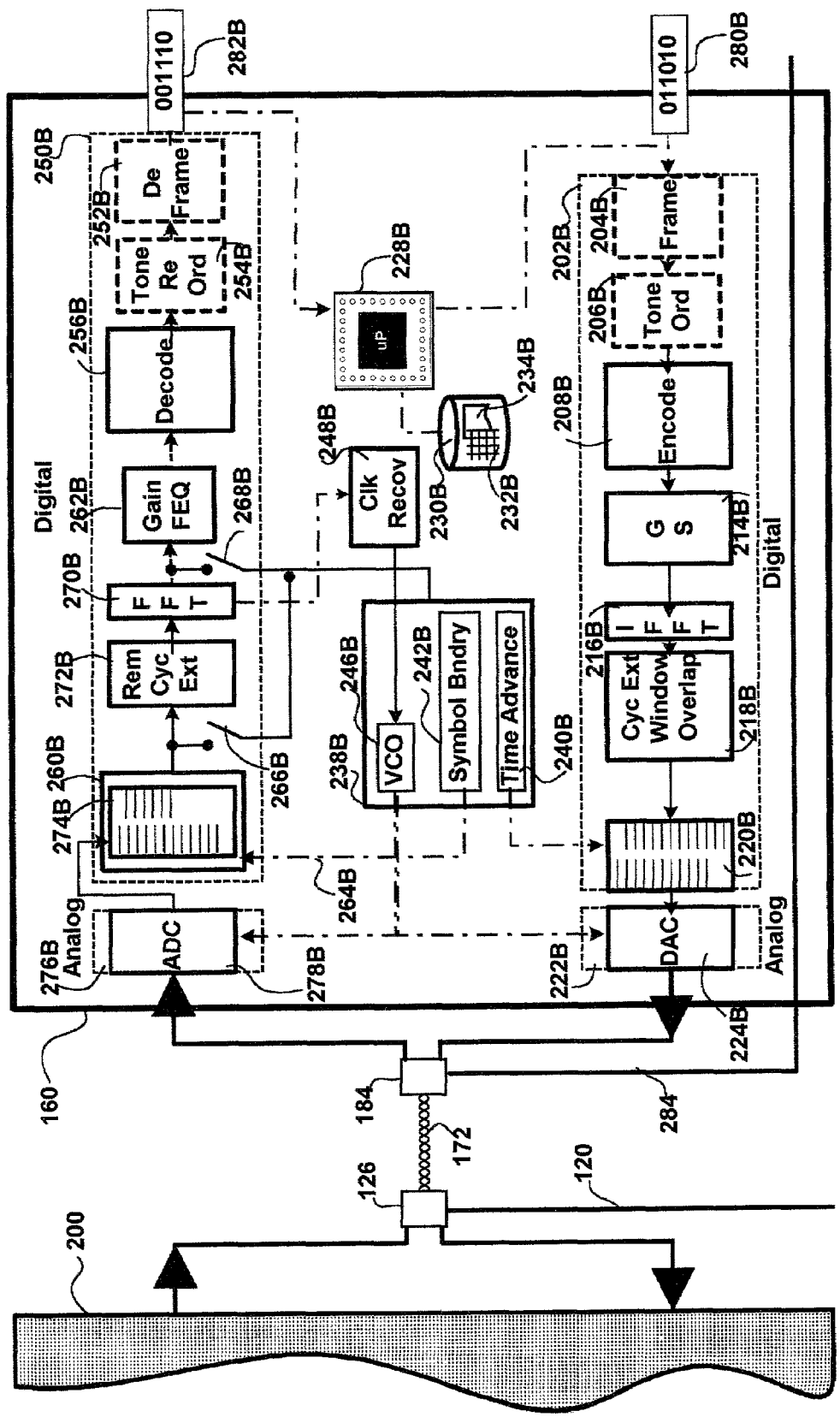

FIGS. 2A–B are detailed hardware block diagrams which show the transmit and receive path components of the logical and physical modems respectively in an embodiment of the current invention. The logical modem is represented in a circuit 200 with a transmit path and a receive path coupled via HFE 126 and subscriber line 172 with the HFE 184 of physical modem 160. The transmit path includes digital and analog portions 202A and 222A respectively for modulation of data. The signal line 120 is shown coupled to the HFE which in this embodiment of the invention contains appropriate filters, or splitter to divert voice band traffic.

During showtime the transmit path accepts a digital stream 280A as input and passes that stream through successive modulation stages. In the framer 204A the data is parsed into predefined packets of bits, with the number of bits determined by the bandwidth of the communication medium established during modem initialization. In the tone orderer 206A the bits are allocated across the tone bins associated with each of the DMT sub channels. The specific number of bits per tone is established during the initialization of the modem. Next in the encoder 208A the bits for each tone are converted to a complex number or sub-symbol which defines the phase and amplitude relationship with which to modulate each sub-channels carrier tone. Then after gain scaling in the gain scaler 214A all of the sub-symbols a.k.a. tones are converted from the frequency domain to tones in the time domain. This is accomplished in the inverse Fourier transform (IFFT) engine 216A. Next in module 218A the cyclic extension, windowing and window overlap is applied to the digitized symbol output by the IFFT. The delay advance buffer 220A couples module 218A with the Digital to analog converter (DAC) 224A which is part of the analog portion 222A of the transmit path. The analog portion may also include an interpolator and digital or analog filters, in alternate embodiments of the invention.

The receive path includes analog and digital portions 276A and 250A respectively for demodulation of data. During showtime the receive path accepts modulated data from subscriber line 172 and digitizes the received data in the analog-to-digital converter 278A which is part of the analog portion of the receive path. The analog portion may also include digital or analog filters and a decimator, in alternate embodiments of the invention. The digitized data is passed to the window synchronizer 260A. The window synchronizer obtains windowed portions of the received datastream from its the buffer 274A and passes each widowed portion to the cyclic prefix removal module 272A. The windowed portions passed from the buffer by the window synchronizer are synchronized with symbol boundaries in the incoming datastream. The symbol may include within its boundaries at this phase of receive path processing both a cyclic prefix and suffix which are removed in the cyclic prefix removal module/component.

Next in the fast Fourier transform (FFT) engine each tone in the time domain is converted to a corresponding tone a.k.a. sub-symbol in the frequency domain. Each sub-symbol may be represented mathematically as a complex number expressing the phase and amplitude relationship between the carrier tone and the pilot or message data modulated thereon. Collectively each set of sub-symbols/tones make up a symbol. When the sub-symbols include pilot and message data they are collectively identified as a training symbol.

Next the appropriate gain scaling and frequency equalization is performed in the gain FEQ module 262A. Subsequently, each sub-symbol is decoded to a corresponding binary sequence in the decoder 256A. The resultant bits associated with each tone are then re-ordered into the initially transmitted sequence via the tone re-orderer 254A and de-framed in deframer 252A. The resultant demodulated digital data stream 282A is output from the de-framer.

The core processor 228A is shown coupled to the transmit and receive path components as well as to the memory 230A and the synchronization module 238A. Memory 230A stores setup data 232A for the specific DMT protocols which the modem supports as well as initialization data 234A, e.g. gain tables, equalization parameters, PSD parameters etc. determined during the initialization of a pair of modems across a given communication medium, e.g. subscriber line 172. The synchronization module of the CO employs a system clock 244A to drive the DAC and the ADC on the transmit and receive paths respectively. The synchronization module also drives the delay advance buffer 220A on the digital portion of the transmit path and the window synchronizer 260A on the digital portion of the receive path. The window synchronizer 260A on the receive path is synchronized with symbol boundaries via the symbol boundary module 242A which is part of the synchronization module. The delay advance buffer 220A on the transmit path advances the transmission of each symbol with respect to the symbols received on the receive path in an amount set by the time advance module 240A which is part of the synchronization module.

During the handshake and training phase of initialization the transmit and receive path components are operated in a different manner than is the case for showtime. The framer and de-framer 204A, 252A, the tone orderer 206A and tone re-orderer 254A on the transmit and receive paths have reduced functionality. The core processor 228A supplies the encoder 208A with the appropriate pilot and message data, for each sub-channel or tone. Selected ones of the tones will be modulated with constant data corresponding with a pilot tone. The pilot tones and the complex data associated therewith are part of the DMT protocol stored in the memories of each of the pair of modems. Other selected ones of the tones will be modulated with variable data corresponding with each message. The symbol encoder 208A converts the pilot and message data for each tone to the complex number, a.k.a. sub-symbol that will be modulated on each tone. Collectively the sub-symbols associated with the pilot tones and message tones make up a training symbol which is converted from the frequency to the time domain by the IFFT 216A. Before conversion, pseudo random adjustments to the phase of each subsymbol are made by a frequency scrambler (not shown) which is part of the encoder. The frequency scrambler is only operational during the training phase of operation. Scrambling each sub-symbol with a pseudo random number assures that the communication channel formed between the two modems will be fully characterized during initialization. The pseudo random number (PRN) sequence used in the frequency scrambler is stored in the respective memories of the sending and receiving modems. The messages generated by the processor convey to the remote modem 160 information such as: bandwidth allocation, radio frequency interference (RFI) bands, transmit power spectral density (PSD) in the downstream and upstream directions, whether power back off (PBO) is performed using a maximum receive PSD or using an upstream PSD mask, the reference PSD, and the overall length of the window at the transmitter. Some of the information depends on modem operational parameters, while other of the information is adaptively determined by monitoring power and gain parameters on the receive path. During training the modems swap roles as transmitter and receiver.

On the receive path the received tones are converted from the time to corresponding tones/sub-symbols in the frequency domain by the FFT 270A. The phase relationship between carrier and data as represented by each pilot sub-symbol derived from a pilot tone includes: a fixed contribution from the pilot data, a known contribution from the scrambling of that data in the transmit path, and a variable and unknown contribution resulting from the frequency dependent phase shifts introduced by the communication medium, e.g. subscriber line 172 which links the pair of modems and a variable phase contribution resulting from misalignments in the window synchronizer 260A. The phase relationship between carrier and data as represented by each message sub-symbol derived from a message tone includes: a variable and unknown contribution from the message data, a known contribution from the scrambling of that data in the transmit path, and a variable and unknown contribution resulting from the frequency dependent phase shifts introduced by the communication medium which links the pair of modems and a variable phase contribution resulting from misalignment in the window synchronizer 260A.

During the symbol synchronization phase of modem training in one embodiment of the invention the windowed portions of the incoming datastream in the time domain as provided by the window synchronizer 260A are passed via switch 266A to the input of the symbol boundary component 242A. In this embodiment of the invention the symbol boundary component correlates the tones in the time domain with a reference set and outputs an alignment signal 264A which indicates the tone offset required to align the windowed portions of the datastream obtained by the window synchronizer with the symbol boundaries. Symbol boundaries encompass at this stage in the receive path any cyclic extensions of the symbol. The tone offset is expressed in terms of a number of samples.

During the symbol synchronization phase of modem training in another embodiment of the invention the windowed portions of the incoming datastream are processed by both the cyclic extension remover 272A and by the FFT 270A which converts the tones within each windowed portion from the time to the frequency domain. Then via switch 268A either selected tones or the entire tone set of each windowed portion is passed from the FFT output to the input of the symbol boundary component 242A. In this embodiment of the invention the symbol boundary component evaluates a phasor angle characteristic of selected tones from each windowed portion from the FFT output and converts the phasor angle characteristic of the selected tones from a selected one of the windowed portions to an alignment signal 264A to align the window synchronizer with the symbol boundaries in the received datastream.

FIG. 2B shows the transmit and receive paths of the physical modem in an embodiment of the current invention. The physical modem 160 is represented with single transmit and receive paths coupled via HFE 184 and subscriber line 172 with the HFE 126 of logical modem 200 shown in FIG. 2A. The components shown on the transmit and receive paths are substantially identical to those discussed above in FIG. 2A with similar components labeled with the same reference number with a "B" suffix replacing the "A" suffix used to identify the components in the logical modem 200 shown in FIG. 2A. The signal line 284 is shown coupled to the HFE 184 which in this embodiment of the invention contains appropriate filters, or splitter to divert voice band traffic. The VCO 246B in the synchronizer module 238B in the remote modem is driven by a clock recovery module 248B. That module is coupled to the digital portion 250B of the receive path to recover the logical modem clock there form. The clock recovery circuit uses a phase lock loop (PLL) and other circuits to generate an error signal with a voltage proportional to the phase error between the clock of the remote modem and the clock 244A at the logical modem. The error signal is used to drive a voltage controlled oscillator (VCO) 246B which is part of the synchronization module. The VCO drives the ADC 278B and the DAC 224B on the analog portions of the receive and transmit paths respectively of the modem 160. During the showtime phase the data stream 280B from the terminal 164 (See FIG. 1) is modulated on the digital 202B and analog 222B portions of the physical modem's transmit path, and the data stream 282B demodulated on the analog 276B and digital 250B portions of the receive path is provided to the terminal.

FIG. 3AB shows the data structures of a received datastream and alternate embodiments for obtaining the windowed portions of the received datastream in either the window synchronizer components 260A–B (See FIG. 2AB) during the symbol boundary synchronization portion of the training phase of modem operation. The received datastream 300 includes successive symbols each of which may contain a cyclic extension. Symbol 304 with a cyclic prefix 302 and a cyclic suffix 306 is referenced. The windowed portions of the datastream obtained in the window synchronizer correspond in length with the length 308 of the symbol including any cyclic extensions.

In the embodiment of the invention in which symbol boundary determination is performed with windowed portions of the datastream in the frequency domain the following Equation 1 expresses the number of windowed portions $W_{\#f}$ required to determine window alignment:

$$W_{\#f} = \frac{S + Xp + Xs}{Xp + Xs}$$

where S is the number of samples per symbol, Xp is the number of samples per cyclic prefix, and Xs is the number of samples per cyclic suffix. For a VDSL modem with 4096 samples to a symbol and with a cyclic extension of 320 samples the total number of windowed portions $W_{\#f}$ equals approximately 14. The computation required to process these windowed portions for symbol boundary synchronization is additionally reduced by the methods discussed in the following drawings and accompanying text which require processing only for selected tones within each windowed portion.

In the embodiment of the invention in which symbol boundary determination is performed with windowed portions of the datastream in the time domain the following Equation 2 expresses the number of windowed portions $W_{\#t}$ required to determine window alignment:

$$W_{\#t} = S + Xp + Xs$$

For a VDSL modem with 4096 samples to a symbol tones to a symbol and with a cyclic extension of 320 samples the total number of windowed portions $W_{\#t}$ equals approximately 4416.

There are two methods of obtaining the $W_{\#f}$ or $W_{\#t}$ windowed portions during the symbol boundary synchronization portion of the training phase of modem operation. These are shown in FIGS. 3A–B. Whether the windowed portions that are presented to the window boundary component come from the time or frequency domain portions of the receive path, the size of the windowed portions of the datastream obtained in the window synchronizer correspond in length with the length 308 of the symbol including any cyclic extensions. In FIG. 3A windowed portions 310 and 312 are shown. In this embodiment consecutive windowed portions are obtained from the datastream at intervals 314 equal in length to the cyclic extension. This approach is consistent with buffering the datastream in the window synchronizer component and successively obtaining windowed portions of the buffered data. In the embodiment of the invention shown in FIG. 3B consecutive windowed portions 324 and 326 of the datastream 300 are obtained at intervals 320 equal in length to the symbol with its own cyclic extension and one additional cyclic extension and/or one additional sample. This approach to windowing is consistent with no buffering of the datastream. Either approach can be utilized provided only that successive symbols contain the same pilot tones.

Figure 4:
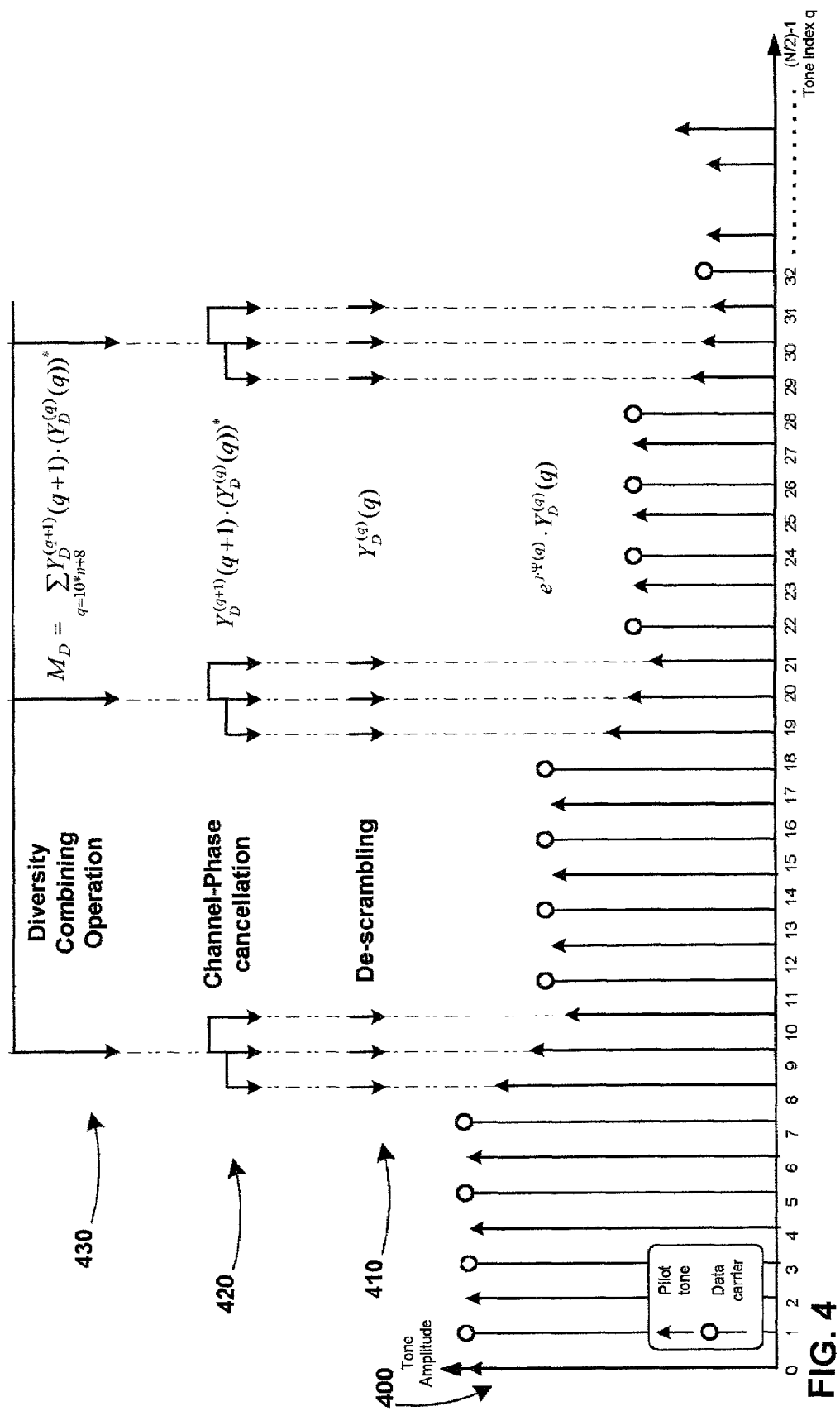
FIG. 4 is a signal diagram showing in the frequency domain an example of a symbol with tones carrying pilot and message data, transmitted between the pair of modems during the training phase of initialization.

FIG. 4 is a signal diagram showing in the frequency domain an example of a symbol with tones carrying pilot and message data, transmitted between the pair of VDSL modems during the training phase of initialization. FIG. 4 also shows which tone bins are selected from the windowed portion of the data in the frequency domain which is delivered to the symbol boundary synchronizer during the symbol boundary synchronization phase of modem initialization. A symbol with tones carrying pilot and message data, transmitted between the pair of modems during the training phase of initialization. The training symbol 400 contains pilot tones and message tones with the pilot tones modulated with pilot data and the message tones modulated with message data. The particular interlacing shown for training symbol 400 corresponds with a VDSL standard. In the example shown in FIG. 4 the amplitude of the message and pilot tones generally decreasing with increasing frequency. Each tone is identified by an associated tone index, a.k.a. bin number. Tones with an odd index carry pilot data and tones with an even index carry message data. The message tones as discussed above are redundant with each byte of message data mapped two bits per tone to the odd tones within each group of 8 tones. The invention is equally applicable to alternate mappings of pilot and message tones. Adjacent pilot tones are found at tone bins 8–10, 19–21 etc. Pilot tones might occur with greater or lesser frequency than message tones of each training symbol depending on the particular standard for multi-tone communication between the modems.

Once a windowed portion of the incoming datastream is received and converted to the frequency domain the symbol boundary detection includes the steps of:

descrambling the selected tones in step 410, canceling the effects of channel phase and tone index in step 420 and diversity combining resultant combined phasors in step 430.

The effects of channel phase and tone index are reduced by multiplying the tone with index (k+1) times the complex conjugate of tone with index k. Since adjacent or proximate pilot tones have substantially equal phases this operation substantially reduces the effect of channel phase.

Figure 5:
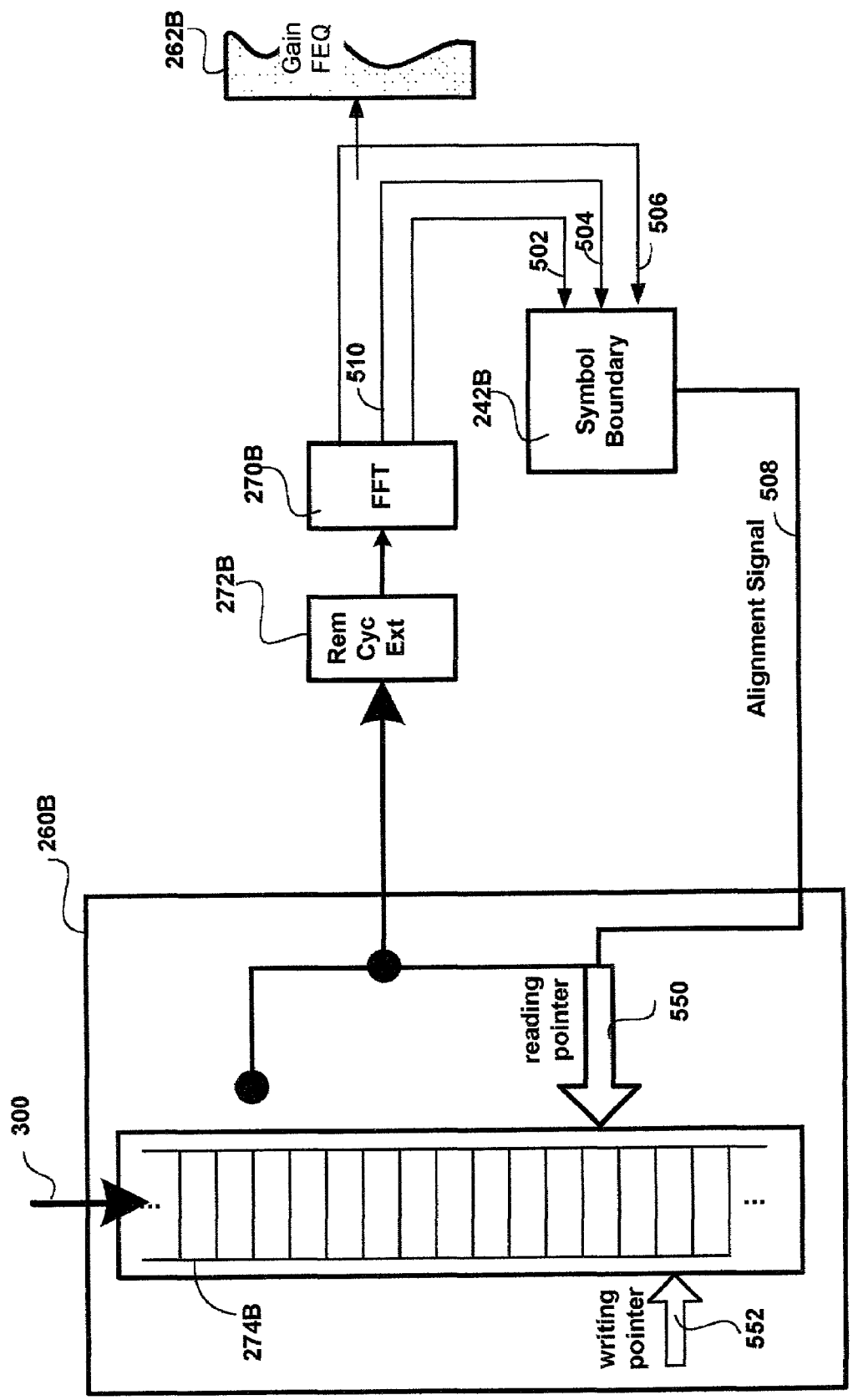
FIG. 5 is an exploded hardware block diagram of the window synchronizer and associated components on the receive path of the modems shown in FIGS. 2A–B.

FIG. 5 is an exploded hardware block diagram of the window synchronizer 260B and associated components on the receive path of the modem shown in FIG. 2B. The window synchronizer obtains windowed portions of the received datastream from its the buffer 274A and passes each widowed portion to the cyclic prefix removal module 272B. The windowed portions passed from the buffer by the window synchronizer are synchronized with symbol boundaries in the incoming datastream 300 through combined operations of the symbol boundary component 242B and the window synchronizer during the symbol boundary synchronization phase of modem initialization. If the write pointer 552 of the buffer is not refreshed then the read pointer 550 will generate successive windowed portions in the manner discussed above in connection with FIG. 3A. Alternatively, if the write pointer is refreshed then the read pointer will generate successive windowed portions in the manner discussed above in connection with FIG. 3B. As each windowed portion is output from the buffer 274B it is converted from the time to the frequency domain by the FFT 270B. In this embodiment of the invention tone selection for processing by the symbol boundary detector is represented at the output of the FFT from which selected tones from the frequency domain at the output of the FFT from each windowed portion are passed via signal lines 502–506 to the symbol boundary component. This component performs the processes set forth in the FIGS. 4, 7,8 and 10A for correcting misalignment of the windowed portions obtained in the time domain using phasor-angle parameters derived in the frequency domain from at least two tones from the set of tones for a selected windowed portion transformed by the FFT. The alignment signal 508 output by the symbol boundary component contains the read pointer adjustment in terms of tone offset for the selected windowed portion from which the phasor angle was calculated. The tone offset is expressed as the number of samples by which the read pointer needs to be adjusted relative to the synchronization with the datastream which existed when the selected windowed portion was obtained. Once the read and write pointers are thus synchronized with the symbol boundaries in the incoming data stream no further symbol boundary synchronization processing in the symbol boundary component need be performed.

Figure 6:
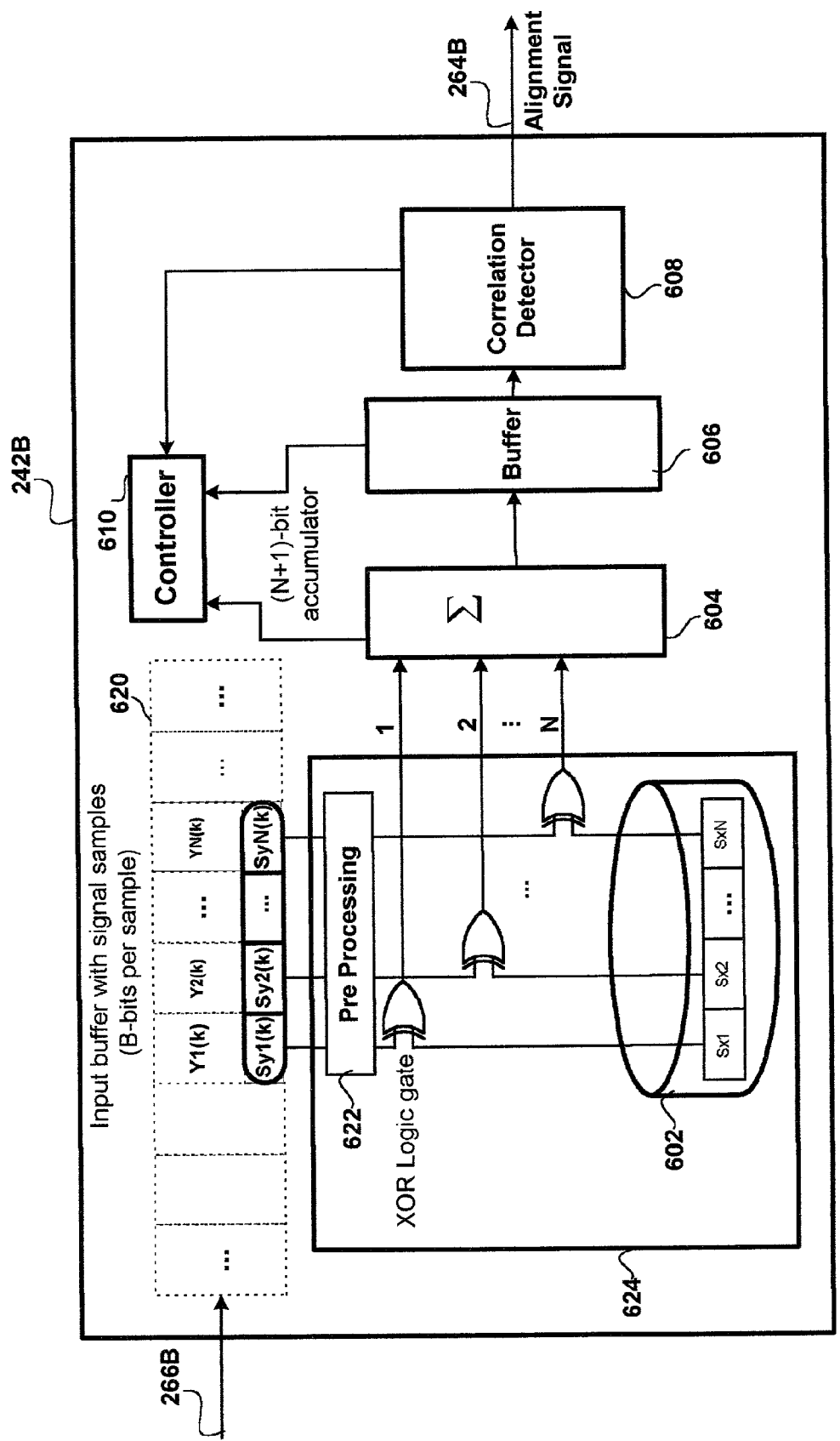
FIG. 6 is a hardware block diagram of an embodiment of the symbol boundary component shown in FIGS. 2A–B for determining symbol misalignment using time domain data

FIG. 6 is a hardware block diagram of an embodiment of the symbol boundary component 242B shown in FIGS. 2A–B for determining symbol misalignment using time domain data. Windowed portions 620 of an incoming datastream 268B (See FIG. 2B) are subject in calculator 624 to preprocessing 622. Preprocessing includes descrambling of the selected tones. Next the sine of selected tones in the incoming datastream are subject to an XOR with the corresponding sines of a reference signal 602 and the outputs are supplied to a summer 604 where they are summed. The sum for each the selected tones within each windowed portion is stored in buffer 606. The correlation detector 608 determines which among the windowed portions exhibits the best correlation based on the corresponding contents in the buffer. A corresponding alignment signal is generated with information as to which windowed portion exhibits the best alignment with the symbol boundary in the incoming data stream. This information is used by the window synchronizer to synchronize window portions with the symbol boundaries in the incoming datastream. The various portions of the symbol boundary component are controlled by controller 610.

Figure 7:
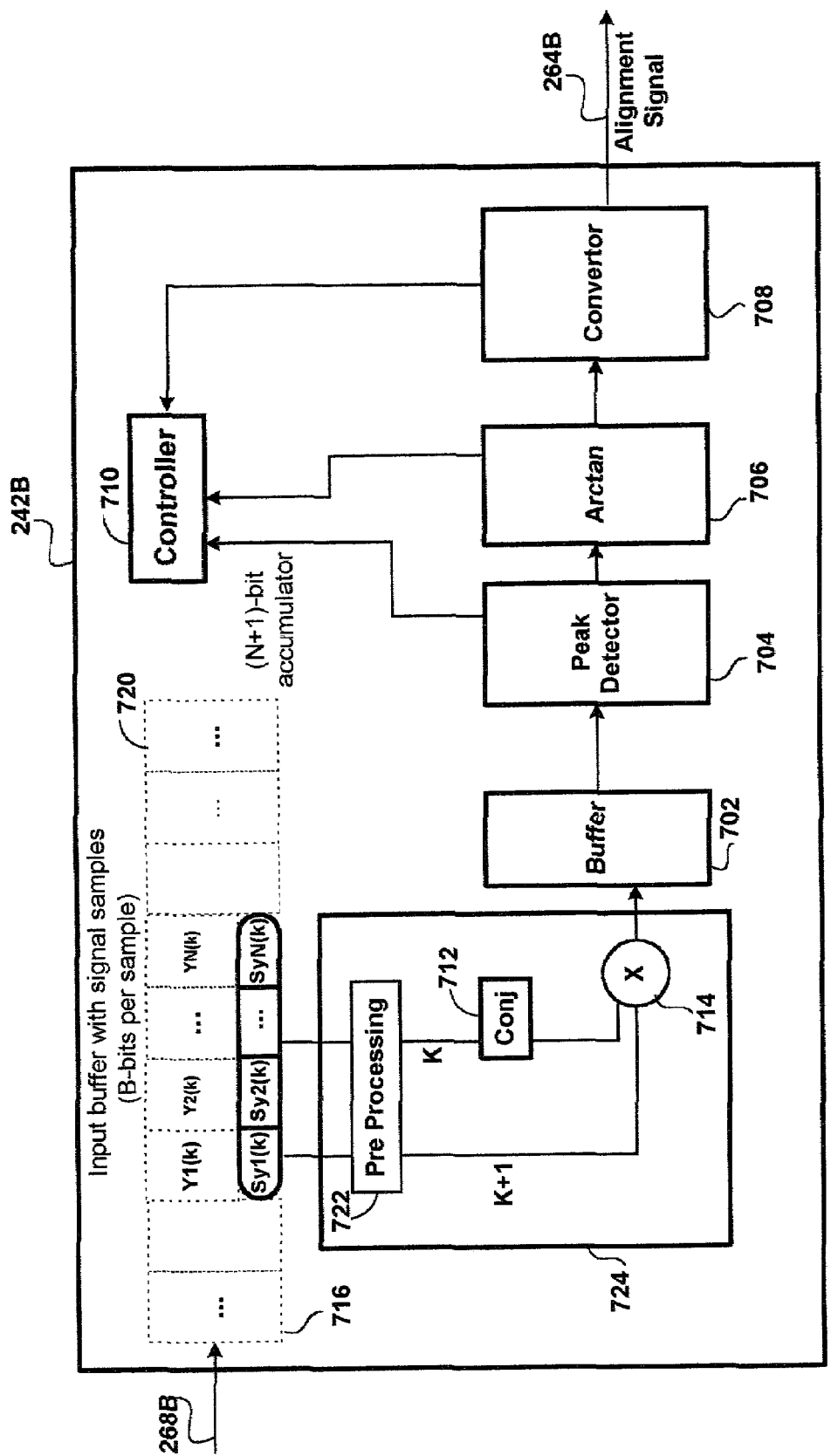
FIG. 7 is a hardware block diagram of an embodiment of the symbol boundary component shown in FIGS. 2A–B for determining symbol misalignment using frequency domain data.

FIG. 7 is a hardware block diagram of an embodiment of the symbol boundary component 242B shown in FIGS. 2A–B for determining symbol misalignment using frequency domain data. Windowed portions 720 of an incoming datastream 268B (See FIG. 2B) are subject in calculator 724 to preprocessing 722. Preprocessing includes descrambling of the selected tones. Next the effects of channel phase and tone index are reduced by multiplying 714 the tone with index (k+1) times the complex conjugate 712 of tone with index k. Since adjacent or proximate pilot tones have substantially equal phases this operation substantially reduces the effect of channel phase. The output for each windowed portion is buffered in buffer. Then the peak detector determines which among the phasor generated by the calculator and stored in the buffer 702 exhibits the peak magnitude. This peak phasor is passed to the arctan logic 706 where the arctan of the phasor is determined. Then in the converter 708 the angle information, i.e. the arctan output in the frequency domain as to window alignment is converted to a tone offset in the time domain. This value along with the synchronization information corresponding with the synchronization state at the time the selected window portion from which the peak phasor was obtained is passed in the form of an alignment signal 264B to the window synchronizer for synchronization of the windowed portions with the symbol boundaries in the incoming datastream. The various portions of the symbol boundary component are controlled by controller 610.

Figure 8:
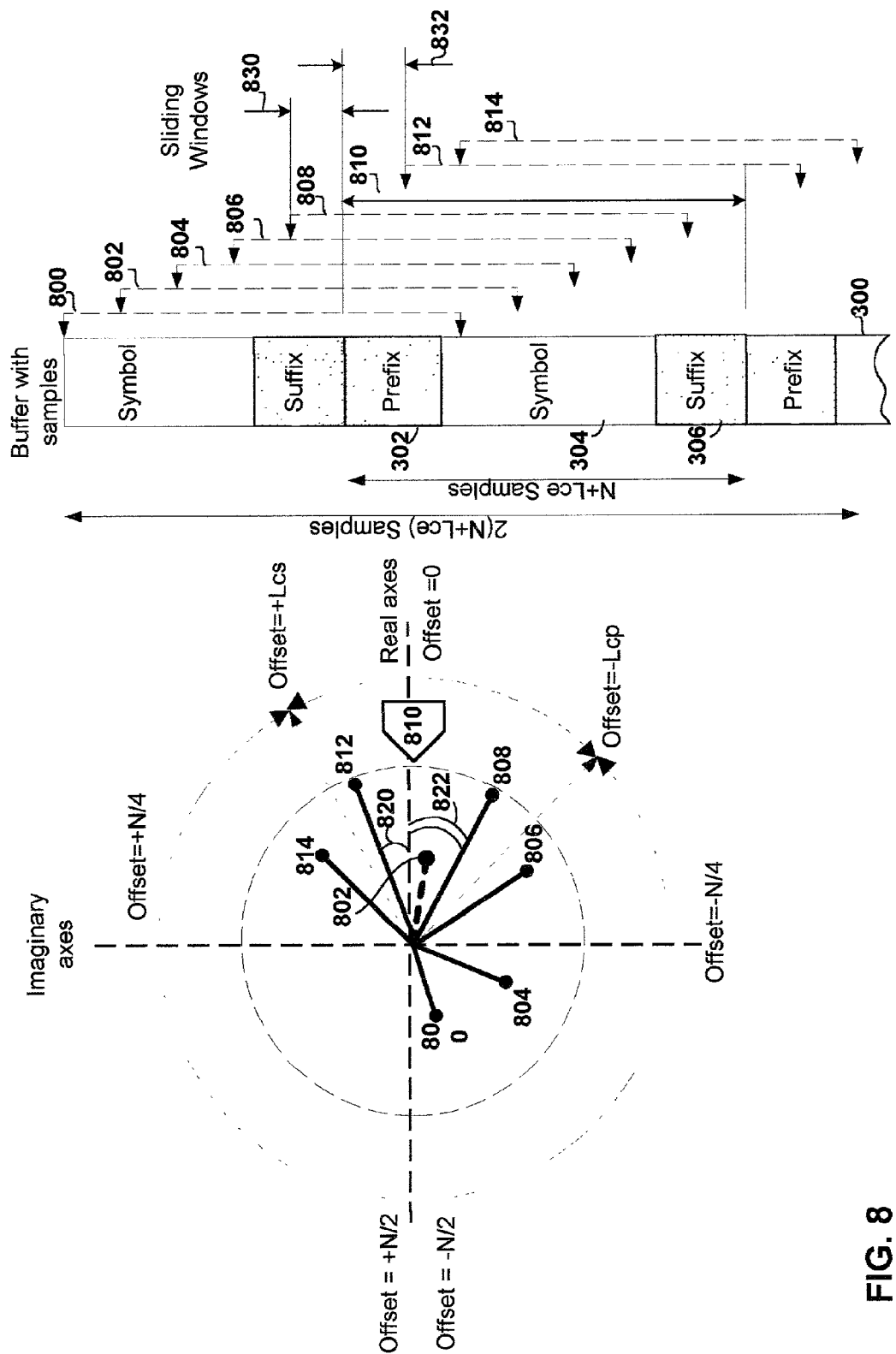
FIG. 8 is a combined phasor and data structure diagram showing the relationship between symbol boundary parameters expressed as a phasor-angle in the frequency domain and a tone offset in the time domain.

FIG. 8 is a combined phasor and data structure diagram showing the relationship between symbol boundary parameters expressed as a phasor-angle in the frequency domain and a tone offset in the time domain. The phasors 802, 804, 806, 808, 812 and 814 and the corresponding windowed portions from which the selected tones which generated the phasors are shown. Once a maximum phasor is calculated, i.e. either phasor 808 of 812 in the example shown the corresponding tone offset, e.g. tone offset 830 for phasor 808 from the corresponding window portion 808 or phasor 812 for the corresponding window portion 812 can be calculated. Either can be used with to align the window synchronizer.

The following section gives a more detailed view of frequency domain symbol boundary synchronization.

Definition of VDSL training signals

The structure of the VDSL multicarrier training signals is shown in FIG. 3AB. FIG. 3A depicts a single multicarrier symbol. The central portion of N samples is the symbol itself. The symbol signal is cyclically extended using a cyclic prefix with Lcp>0 samples and a cyclic suffix with Lcs>0 samples. The total length of the extended symbol is N+Lce, where Lce=Lcs+Lcp<N. The training signal consists of a sequence of symbols. FIG. 3A shows 4 of those extended symbols. Each symbol in the training signals is composed of both pilot carriers and data carriers. Due to the presence of cyclic extensions, the pilot carriers contain phase discontinuities at the transitions between extended symbols. The data in the data carriers changes from symbol to symbol, therefore, the training signal is not periodic.

Definition of symbol boundary

The symbol synchronization process estimates the start of the multicarrier symbol, or alternatively, the start of the cyclic prefix. In FIG. 8 the boundary for a symbol is the represented by a window with sample offset zero. To find where this point lies in the received training signal, a sliding window containing a block of N+Lce samples starting at some point with sample offset non zero is taken and analyzed. From every sliding window we can find the value of the tone offset relative to the zero sample offset. We try different windows until we find one with sample offset very close to zero. The start of this window marks approximately the boundary of the symbol. Since we do not have information a priori about the symbol boundary, each window can actually contain samples belonging to different extended symbols. For a given window, calculation of the corresponding value of sample offset can be accomplished in the frequency domain using the following FFT property.

Definition of FTT property. Let $X_k^{(q)}(n) = \sqrt{2} \cdot e^{j \cdot \Omega} \cdot H(q) \cdot e^{j \cdot 2 \cdot \pi \cdot q \cdot n/N}$ be the pilot with index q, where $\sqrt{2} \cdot e^{j\Omega}$ is the modulation term and H(q) is the channel effect. Let $a_D(n)$ be a function such that $|a_D(n)|=1$. We can write $$W_D = a_D(n) \cdot x_k^{(q)}(n+D) \to FFT \to Y_D^{(q)}(m) = \sqrt{2} \cdot e^{j\Omega} \cdot H(m) \cdot e^{j\Phi_D(m)} \cdot A_D(m-q), \quad (1)$$

where $\Phi_D(m) = +2 \cdot \pi \cdot m \cdot D|N$, $A_D(m)$ is the FFT of $a_D(n)$ and $x_k^{(q)}(n+D)$ means a circular shift by D samples, where D is denoting the sample offset.

Description of the invention

The received VDSL training signal consist of several pilots with index $q \in Q = \{10*n+8\} \cup \{10*n+8+1\}$, where n is a positive integer such that the pilots lie in the band plan. For every window containing pilots and data carriers we can find a phasor by selecting at least two pilots and multiplying one by the complex conjugated of the other. This operation cancel the phase produced by the modulation and channel, leaving the phasor with just a phase rotation representing the symbol boundary. This phasor will be used to find the symbol boundary. Flow diagram in FIG. 10 A shows the steps involved in the invention.

Figure 9:
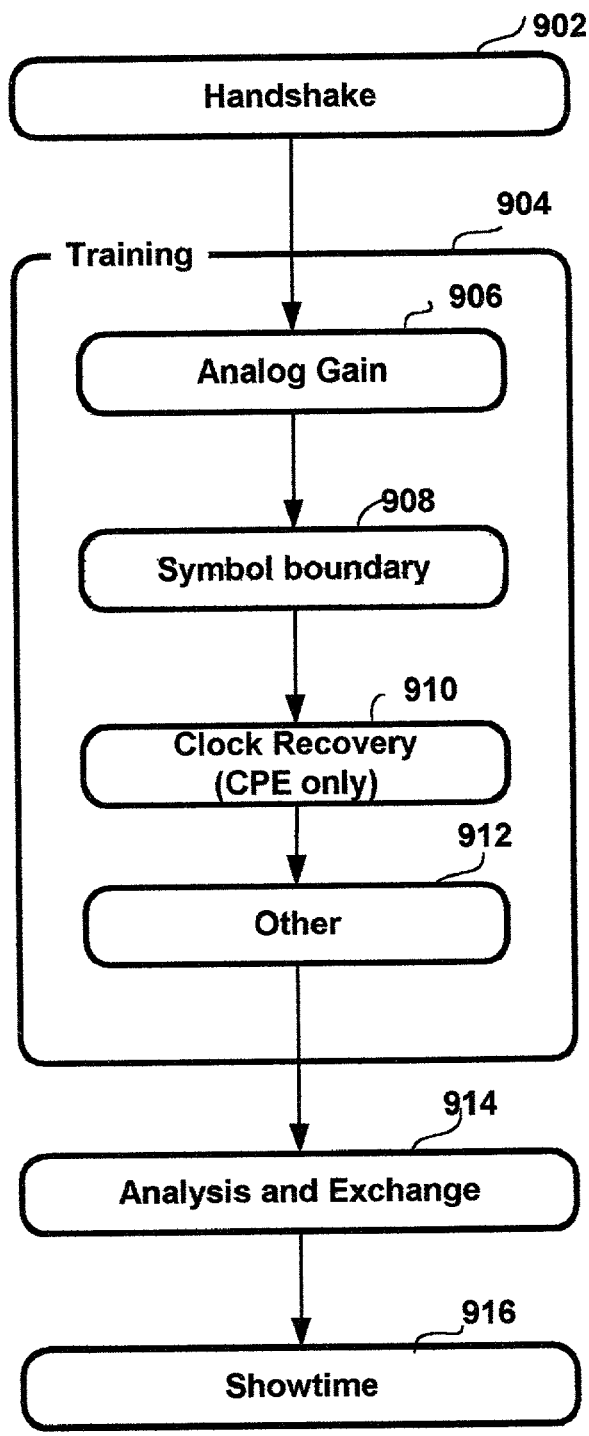
FIG. 9 is a process flow diagram of the phases of modem operation.

FIG. 9 is a process flow diagram of the phases of modem operation. FIG. 9 depicts a flow diagram describing a typical protocol to initialize and operate a DMT modem, comprising the phases of handshake 902, training 904, channel analysis and exchange 914 and showtime 916. The handshake 902 uses a simple BPSK modulation to allow both modems to exchange capabilities and system parameters to optimize the modem operation and to comply with regulations. During training 904 the modem adaptively sets the parameters of different block according to certain properties of the received signals. In analog gain 906 the analog gains are calculated based on the power of the received signal. In symbol boundary 908 the properties of the training signals are exploited to find the start and the stop of the symbol. The clock recover 910 exploits the properties of the training signals to align the frequency sampling of the logical modem with the frequency sampling of the physical modem Other 912 blocks initialized in training include equalizers and link optimization such as frequency dependant signal power shaping. During analysis and exchange 914 the modem find the optimum bit loading for every tone. Showtime 916 is the normal operation of the modem for data communication.

FIGS. 10A–B are detailed process flow diagrams of alternate embodiments of the invention in which symbol boundary alignment is determined with frequency and time domain data respectively.

FIG. 10 A describes the symbol boundary based on frequency domain calculations. Operation Windowing received Datastream 1000 obtains in a time domain windowed portions of a received datastream with symbols each expressed with a corresponding set of tones and with the windowed portions obtained in a training phase exhibiting varying degrees of misalignment with corresponding symbol boundaries, and removes a number of tones proportionate to any cyclic extensions present in the windowed portion prior to transformation in the transforming act. Operation transforming from frequency domain 1002 transforms the set of tones from each windowed portion from the time domain to a corresponding set of tones in a frequency domain. Operation correcting misalignment 1004 corrects misalignment of the windowed portions obtained in the time domain using phase-angle parameters derived in the frequency domain from at least two tones from the set of tones for a selected windowed portion transformed in the transforming act. Operation descrambling 1006 de-scrambles the pilot tones selected in the selecting act. Operation selecting toners 1008 selects a first and a second pilot tone within each set of tones. Operation deriving a phasor from a combination of the selected tones 1010 multiplies the first of the pilot tones times a complex conjugate of the second of the pilot tones to obtain the phasor for the corresponding set of tones. Operations determining a peak phasor 1012 determines a peak phasor among the phasors derived in the deriving act with the peak phasor exhibiting a peak magnitude relative to phasors. Operation converting a phasor-angle of the peak phasor to a tone offset 1014 converts a phasor-angle of the peak phasor to a tone offset required to correct misalignment of the windowed portions obtained in the time domain. Operation generating the alignment signal 1016 generates the alignment signal that includes parameters identifying both a corresponding windowed portion and a required tone offset to align the windowed portion with the symbol boundaries. Opeartion aligning the window synchronizer with symbol boundaries in a receive data stream 1018 responds to an alignment signal to obtain succeeding windowed portions of the incoming datastream aligned with the corresponding symbol boundaries therein.

FIG. 10B depicts the method for symbol boundary synchronization based on time domain calculations. The obtaining in a time domain windowed portions of a received data stream 1020 obtains in a time domain windowed portions of a received datastream with symbols each expressed with a corresponding set of tones and with the windowed portions obtained in a training phase exhibiting varying degrees of misalignment with corresponding symbol boundaries. Operation descrambling 1022 de-scrambles the pilot tones selected in the selecting act. Operation Xor of selected tones with reference set 1024 performs an 'exclusive or' (XOR) between the sign values of the selected tones of each windowed portion and the reference set. Operations Obtaining some of the Xors for each windowed portion 1026 and operation determining windowed portion with maximum sum identify the corresponding windowed portion for which the sign values of the selected tones exhibits maximum correlation to align the windowed portions obtained in the obtaining act with the corresponding symbol boundaries.

Operation generating the alignment signal 1030 generates the alignment signal that includes parameters identifying both a corresponding windowed portion and a required tone offset to align the windowed portion with the symbol boundaries.

Operation aligning the window synchronizer with symbol boundaries in a receive data stream 1032 responds to an alignment signal to obtain succeeding windowed portions of the incoming datastream aligned with the corresponding symbol boundaries therein.

In an alternate embodiment of the invention in which the communication medium linking the modems is wireless the above described message processing methods and apparatus may be utilized with equal advantage during both training and showtime phases. In many wireless standards such as IEEE 802.11 A both training and showtime symbols include pilot tones and message tones.

In an alternate embodiment of the invention a device equivalent to an FFT may be utilized to convert the received tones from the time to the frequency domain. Examples of such equivalent devices include digital bandpass filters for each received tone.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for symbol boundary synchronization in a multi-tone modem with a plurality of components forming a transmit path and a receive path: and the receive path components of the multi-tone modem comprising:
    a window synchronizer to obtain windowed portions of a received datastream with symbols each expressed with a corresponding set of tones in a time domain and with the windowed portions obtained in a training phase exhibiting varying degrees of misalignment with corresponding symbol boundaries and with the window synchronizer responsive to an alignment signal to obtain succeeding windowed portions of the incoming datastream aligned with the corresponding symbol boundaries therein;
    a converter coupled to the window synchronizer to convert the set of tones from each windowed portion from the time domain to a frequency domain; and
    a symbol boundary component coupled to the converter to evaluate a phasor angle characteristic of selected tones from each windowed portion converted by the converter and to convert the phasor angle characteristic of the selected tones from a selected one of the windowed portions to the alignment signal to align the window synchronizer with the symbol boundaries in the received datastream and the symbol boundary component including:
        a calculator for selecting at least one set of adjacent pilot tones within each successive windowed portion and for determining for each adjacent pair of tones in the at least one set a corresponding phasor resulting from multiplying a one tone of each adjacent pair by a complex conjugate of an other;
        a peak detector for detecting from among the phasors of successive windowed portions from the calculator, a peak phasor which exhibits a peak magnitude; and
        a converter for converting the phasor angle of the peak phasor detected in the peak detector to the alignment signal with a tone offset required to align the windowed portion obtained by the window synchronizer with the corresponding symbol boundaries.

2. An apparatus for symbol boundary synchronization in a multi-tone modem with a plurality of components forming a transmit path and a receive path; and the receive path components of the multi-tone modem comprising:
    a window synchronizer to obtain windowed portions of a received datastream with symbols each expressed with a corresponding set of tones in a time domain and with the windowed portions obtained in a training phase exhibiting varying degrees of misalignment with corresponding symbol boundaries and with the window synchronizer responsive to an alignment signal to obtain succeeding windowed portions of the incoming datastream aligned with the corresponding symbol boundaries therein, and a number of windowed portions '$W_{\#f}$' obtained by the window synchronizer during the training phase substantially corresponding with:

$$W_{\#f} = \frac{S + Xp + Xs}{Xp + Xs}$$

where 'S' corresponds with a number of samples per symbol, 'Xp' corresponds with a number of samples per cyclic prefix, and 'Xs' corresponds with a number of samples per cyclic suffix;
    a converter coupled to the window synchronizer to convert the set of tones from each windowed portion from the time domain to a frequency domain; and
    a symbol boundary component coupled to the converter to evaluate a phasor angle characteristic of selected tones from each windowed portion converted by the converter and to convert the phasor angle characteristic of the selected tones from a selected one of the windowed portions to the alignment signal to align the window synchronizer with the symbol boundaries in the received datastream.

3. A method for demodulating data received over a communication medium with a communication channel with multiple pilot tones with pilot data modulated thereon; and the method for demodulating comprising;
    obtaining in a time domain windowed portions of a received datastream with symbols each expressed with a corresponding set of tones and with the windowed portions obtained in a training phase exhibiting varying degrees of misalignment with corresponding symbol boundaries;
    transforming the set of tones from each windowed portion from the time domain to a corresponding set of tones in a frequency domain; and
    correcting misalignment of the windowed portions obtained in the time domain using phasor-angle parameters derived in the frequency domain from at least two tones from the set of tones for a selected windowed portion transformed in the transforming act;
        deriving phasors from the combination of the at least two selected tones within each set of tones transformed in the transforming act;
        determining a peak phasor, among the phasors derived in the deriving act with the peak phasor exhibiting a peak magnitude relative to phasors; and
    converting a phasor-angle of the peak phasor to a tone offset required to correct misalignment of the windowed portions obtained in the time domain; and wherein a number of phasors $W_{\#f}$ derived in the deriving act substantially corresponds with:

$$W_{\#f} = \frac{S + Xp + Xs}{Xp + Xs}$$

where 'S' corresponds with a number of samples per symbol, 'Xp' corresponds with a number of samples per cyclic prefix, and 'Xs' corresponds with a number of samples per cyclic suffix.

4. A method for symbol boundary synchronization of a received datastream of a multi-tone modulated communication channel; and the method comprising:
    obtaining in a time domain successive windowed portions of the received datastream with symbols each expressed with a corresponding set of tones and with the windowed portions obtained in a training phase exhibiting varying degrees of misalignment with corresponding symbol boundaries;

transforming the set of tones from each windowed portion from the time domain to a corresponding set of tones in a frequency domain; and correcting symbol boundary misalignment of the successive windowed portions by:
    selecting at least one set of adjacent pilot tones within each successive windowed portion;
    determining for each adjacent pair of tones in the at least one set a corresponding phasor by multiplying a one pilot tones of each adjacent pair times a complex conjugate of an other;
    detecting from among the phasors of successive windowed portions from the calculator, a peak phasor which exhibits a peak magnitude; and
    converting a phasor-angle of the peak phasor detected in the detecting act to a tone offset required to correct symbol boundary misalignment of the windowed portions obtained in the time domain.

5. The method of claim 4, further comprising the act prior to the multiplying act of:
    de-scrambling the pilot tones selected in the selecting act.

* * * * *